(12) United States Patent
Long et al.

(10) Patent No.: US 7,201,549 B2
(45) Date of Patent: Apr. 10, 2007

(54) LOAD CARRYING VEHICLE

(75) Inventors: Mark James Long, 5 Glenmore Close, Assagay, Hillcrest, 3610 (ZA); Desley Henwood May, Durban (ZA)

(73) Assignee: Mark James Long, Hillcrest (ZA)

( * ) Notice: Subject to any disclaimer, the term of this patent is extended or adjusted under 35 U.S.C. 154(b) by 393 days.

(21) Appl. No.: 10/416,949

(22) PCT Filed: Nov. 15, 2001

(86) PCT No.: PCT/IB01/02150

§ 371 (c)(1),
(2), (4) Date: May 15, 2003

(87) PCT Pub. No.: WO02/40314

PCT Pub. Date: May 23, 2002

(65) Prior Publication Data

US 2004/0028496 A1 Feb. 12, 2004

(30) Foreign Application Priority Data

Nov. 15, 2000 (ZA) .................... 2000/6644

(51) Int. Cl.
*B63B 25/00* (2006.01)
(52) U.S. Cl. ............................................. 410/77
(58) Field of Classification Search ............... 410/24, 410/26, 28, 28.1, 29.1, 77, 78, 121, 129
See application file for complete search history.

(56) References Cited

U.S. PATENT DOCUMENTS

| | | | | |
|---|---|---|---|---|
| 3,057,489 A | * | 10/1962 | Gilliam, Jr. ................. | 414/528 |
| 3,610,431 A | * | 10/1971 | Rodden ..................... | 211/207 |
| 3,690,272 A | * | 9/1972 | Ogle et al. .................. | 410/77 |
| 3,891,102 A | * | 6/1975 | Blount ....................... | 414/545 |
| 4,527,826 A | * | 7/1985 | O'Neal ........................ | 296/3 |
| 4,630,990 A | * | 12/1986 | Whiting ..................... | 414/462 |
| 4,659,132 A | * | 4/1987 | Day ........................... | 296/186.4 |
| 4,668,141 A | * | 5/1987 | Petersen ..................... | 410/12 |
| 5,036,951 A | * | 8/1991 | Frangos ..................... | 187/214 |
| 5,096,216 A | * | 3/1992 | McCalla .................... | 280/414.1 |
| 5,443,350 A | * | 8/1995 | Wilson ....................... | 414/495 |
| 5,595,465 A | * | 1/1997 | Knott ......................... | 410/24 |
| 5,931,262 A | * | 8/1999 | Greenlaw et al. ........... | 187/244 |
| 5,938,382 A | * | 8/1999 | Andre et al. ................ | 410/24 |

FOREIGN PATENT DOCUMENTS

| | | | |
|---|---|---|---|
| DE | 29721873 | 3/1998 | |
| GB | 903229 | 8/1962 | .............. 78/4 |
| GB | 2274627 | 8/1994 | |

OTHER PUBLICATIONS

International Search Report corresponding to PCT/IB01/02150 mailed on Jun. 13, 2002.

* cited by examiner

*Primary Examiner*—H Gutman
(74) *Attorney, Agent, or Firm*—Myers Bigel Sibley & Sajovec, PA

(57) ABSTRACT

The invention relates to a load carrying vehicle of the type that has a load deck and a body forming a load carrying compartment above the load deck. The invention provides a load support structure for a load carrying vehicle of the said type. The load support structure comprises at least one load platform and at least one platform support structure, which is located along the longitudinal center line of the load deck. In its operative condition, the load platform is supported on the platform support structure at an elevated level above the load deck and approximately parallel thereto, thus permitting items to be located both on the load platform and on the load deck below the load platform for transportation purposes.

15 Claims, 5 Drawing Sheets

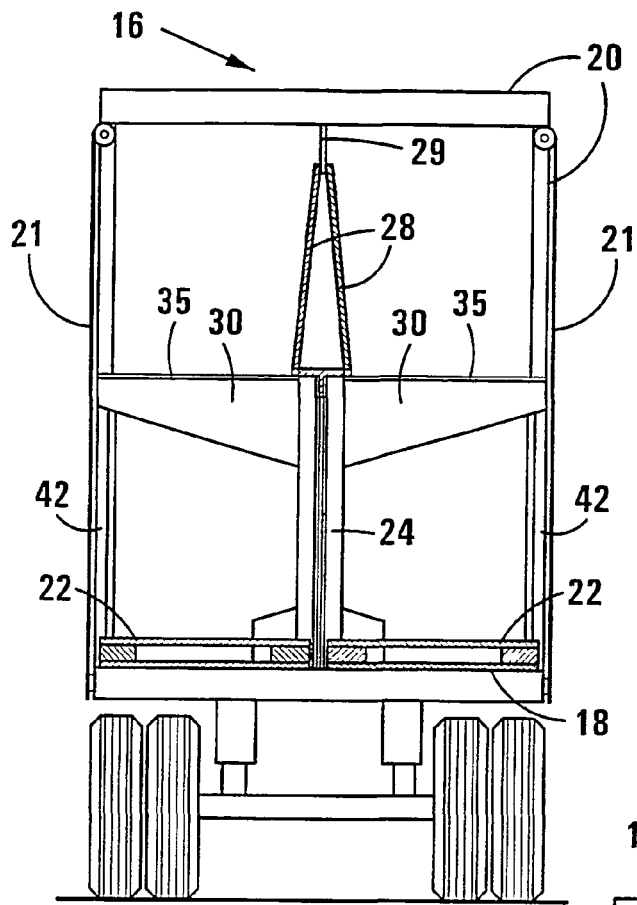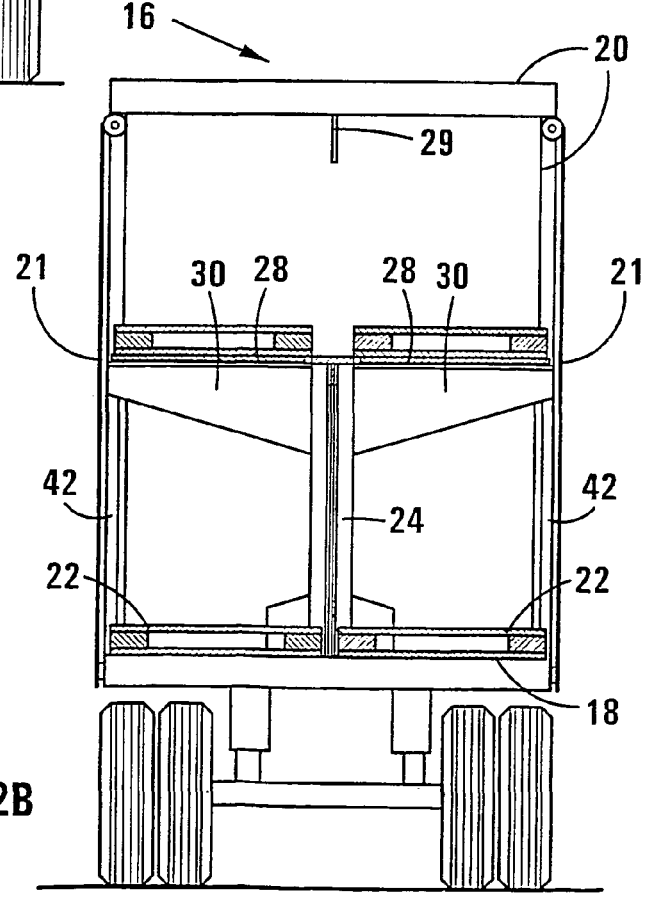

LOAD CARRYING VEHICLE

RELATED APPLICATIONS

This application claims priority under 35 U.S.C. § 371 from PCT Application No. PCT/IB01/02 150, filed in English on Nov. 15, 2001, the disclosure of which is incorporated by reference herein in its entirety.

This invention relates to a load carrying vechile.

FIELD OF THE INVENTION

The invention relates in particular to a load carrying vehicle of the type that has a body forming a load carrying compartment above a load deck, and in which the load carrying compartment is of the side loading type and provides for the transportation of products carried on pallets, on load sheets, in containers, directly on the load deck, and the like. A load carrying vehicle of the type herein envisaged either may be a truck having its own load carrying compartment or may be a trailer, any reference hereinafter to a load carrying vehicle being a reference to either one of such a truck and such a trailer.

BACKGROUND OF THE INVENTION

The invention will herein generally be described with reference to the location of a load item within the load carrying compartment and a load item, as referred to herein, must be interpreted as a product carried directly on a surface provided by the load carrying vehicle for this purpose, a product and a load sheet on which it is carried, a product and a pallet on which it is carried, a product and a container in which it is transported, a pallet only, and so forth. Furthermore, references herein to the centre line of the load deck must be interpreted as a reference to an imaginary line defined along the entire length of the load deck of a load carrying vehicle and dividing it into two equal side halves. A side half of a load deck, as referred to herein, must be interpreted accordingly.

The general configuration of a load carrying vehicle of the type herein envisaged is well known and insofar as this does not form a part of the present invention, this is not described in any further detail herein. It is also well known in relation to a load carrying vehicle of the type, that the space utilisation of the load carrying compartment can be very inefficient when transporting load items, particularly voluminous type items. In particular, when carrying such load items, it is often not possible to stack one load item on another, insofar as the lower load item can be damaged thereby.

The space within the load carrying compartments are thus either utilised inefficiently or, despite the possibility of load items being damaged, in order to minimize transportation costs, load items are in fact stacked upon one another, resulting in lower load items collapsing, or being otherwise damaged.

SUMMARY OF THE INVENTION

It is thus an object of this invention to ameliorate, amongst others, the above problems.

In relation to the loading of the load carrying compartment of a load carrying vehicle of the type herein envisaged, and in order to clarify the invention as hereinafter defined, load items conventionally are loaded on the load deck of the vehicle from opposite sides thereof in an arrangement in which a row of load items extends along the length of the deck along each side half of the deck.

According to the invention there is provided a load carrying vehicle which has a body forming a load carrying compartment above a load deck and which includes a load support structure comprising at least one load platform for supporting at least one load item; and a platform support structure located along the centre line of the load deck, supporting the load platform at an elevated level above a side half of the load deck, at a location between opposite ends of the load deck.

By supporting the load platform at a suitable elevated level above the load deck, it will be permitted, for transporting load items, to position a load item on the load deck beneath the load platform and another load item on the load platform, thus permitting substantially the entire height of the load carrying compartment in the region of the load platform to be utilised for carrying load items for transportation purposes.

The load platform may extend along the entire length of the load carrying compartment, i.e. from the head end to the tail end thereof, although a preferred embodiment of the invention provides for the load carrying vehicle to include above a side half of the deck two or more platforms, that in combination, either extend along the entire length of the load carrying compartment or along a selected part or selected parts of the length of the load carrying compartment. Each such load platform either may provide for a single load item to be supported thereon, or may provide for a number of load items to be supported thereon, e.g. two or three pallets.

A further embodiment of the invention provides for load platforms to be supported above both side halves of the load deck, thus in effect providing for enhanced space utilisation within the entire load carrying compartment of the load carrying vehicle of the invention.

Each load platform of the load carrying vehicle of the invention may be supported by a platform support structure that comprises two spaced substantially upright platform support columns, secured on the load deck along the centre line of the load deck, and a platform support beam extending between the support columns along the said centre line at substantially the elevated level at which the load platform is supported.

The support columns accordingly are positioned at spaced locations along the centre line, the spacing between the support columns being determined by the effective length of the load platforms. Also, each pair of support columns and the support beam extending between them can support two load platforms that extend in opposite directions from the support beam.

Still further according to the invention, each support beam may incorporate a hinge arrangement which permits the hinged displacement of a load platform supported by the platform support structure between an operative position, in which it extends in a substantially parallel configuration with respect to the load deck of the vehicle, and an inoperative position, in which it extends in a substantially perpendicular configuration with respect to the load deck within the load carrying compartment of the vehicle above the centre line of the load deck. Each support column may have, for each load platform supported thereby, a platform support arm that extends therefrom in a direction perpendicular to the centre line of the load deck to the side of the load carrying compartment, in a location where it can support an end of the load platform.

Each support column also may include a height adjustment arrangement for adjusting the effective height of the support beam and the support arms extending therefrom, where provided, with respect thereto, thus providing for height adjustment of load platforms supported by the platform support structures. The height adjustment arrangement either may be hydraulically, pneumatically, electrically or mechanically operable and insofar as the exact configuration and operation of the height adjustment arrangement is greatly variable, this is not defined in further detail herein.

Still further according to the invention, the load carrying vehicle may include support posts secured to the load deck at a location near the side edge of the load deck, where it can support the operative free ends of the respective support arms. As such, each load platform may be associated with two support posts whereby the effective support of the load platform is enhanced.

Insofar as the particular mechanical arrangement associated with the load carrying vehicle of the invention and, particularly, associated with the load platforms and platform support structures within the load carrying compartment, is greatly variable, this is not defined in further detail herein. The invention extends to all such alternative configuration arrangements which still incorporate the essential principles of the invention as herein defined.

Insofar as platform support structures and load platforms can be retrofitted within the load carrying compartment of a load carrying vehicle, the invention extends also to platform support structures and load platforms as such, that are particularly provided for the purpose.

The invention extends still further to a load support structure for a load carrying vehicle, which comprises
at least one load platform for supporting at least one load item; and
a platform support structure located along the centre line of the load deck, supporting the load platform at an elevated level above a side half of the load deck, at a location between opposite ends of the load deck.

BRIEF DESCRIPTION OF THE DRAWINGS

The invention is now described, by way of examples, with reference to the accompanying diagrammatic drawings, in which:

FIGS. 2A, 2B and 2C show three cross-sectional views of one of the load carrying vehicles shown in FIG. 1, at different locations along the length thereof;

DETAILED DESCRIPTION OF THE INVENTION

Figure 1:
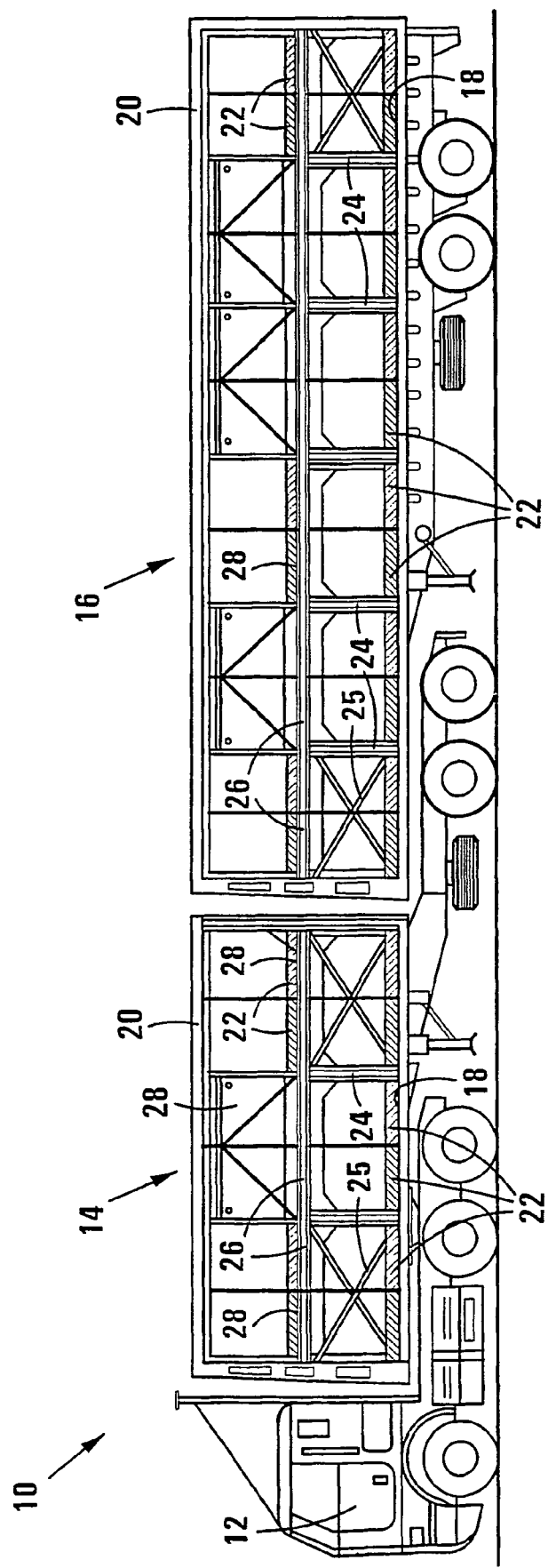
FIG. 1 shows a side view of a transport vehicle which incorporates two load carrying vehicles, in accordance with the invention.

Referring initially to FIGS. 1 and 2 of the drawings, a transport vehicle incorporating two load carrying vehicles, in accordance with the invention, is designated generally by the reference numeral 10. The transport vehicle 10 includes tractor 12 which is operatively coupled with a first load carrying vehicle 14 in the form of a shorter trailer and a second load carrying vehicle 16 in the form of a longer trailer. The overall configuration of the tractor and trailer combination is essentially conventional and, as such, is not described in further detail herein.

Each trailer 14 and 16 has a load deck 18 and a body 20 extending operatively upwardly from the load deck 18 and forming a load carrying compartment that defines an interior space within which load items can be transported.

Both trailers 14 and 16 are of the side loading type including, for the example shown, displaceable curtains (not shown in FIG. 1, but see reference numeral 21 in FIGS. 2A to 2C) on opposite sides thereof that are displaceable to provide access into the space defined by the bodies 20, to permit loading of load items in the form of pallets 22 into the load carrying compartments formed by the bodies.

The shorter trailer 14 particularly defines two side halves on its load deck 18, each capable of supporting six pallets, whereas the longer trailer 16 defines two side halves on its load deck 18, each capable of supporting twelve pallets. The load deck 18 of the shorter trailer 14 thus provides for twelve pallets to be accommodated thereon, whereas the load deck 18 of the longer trailer 16 provides for twenty-four pallets to be accommodated thereon. The location of such pallets 22 on the load decks 18 of the trailers 14 and 16 is illustrated clearly in FIGS. 1 and 2 of the drawings.

Figure 2C:
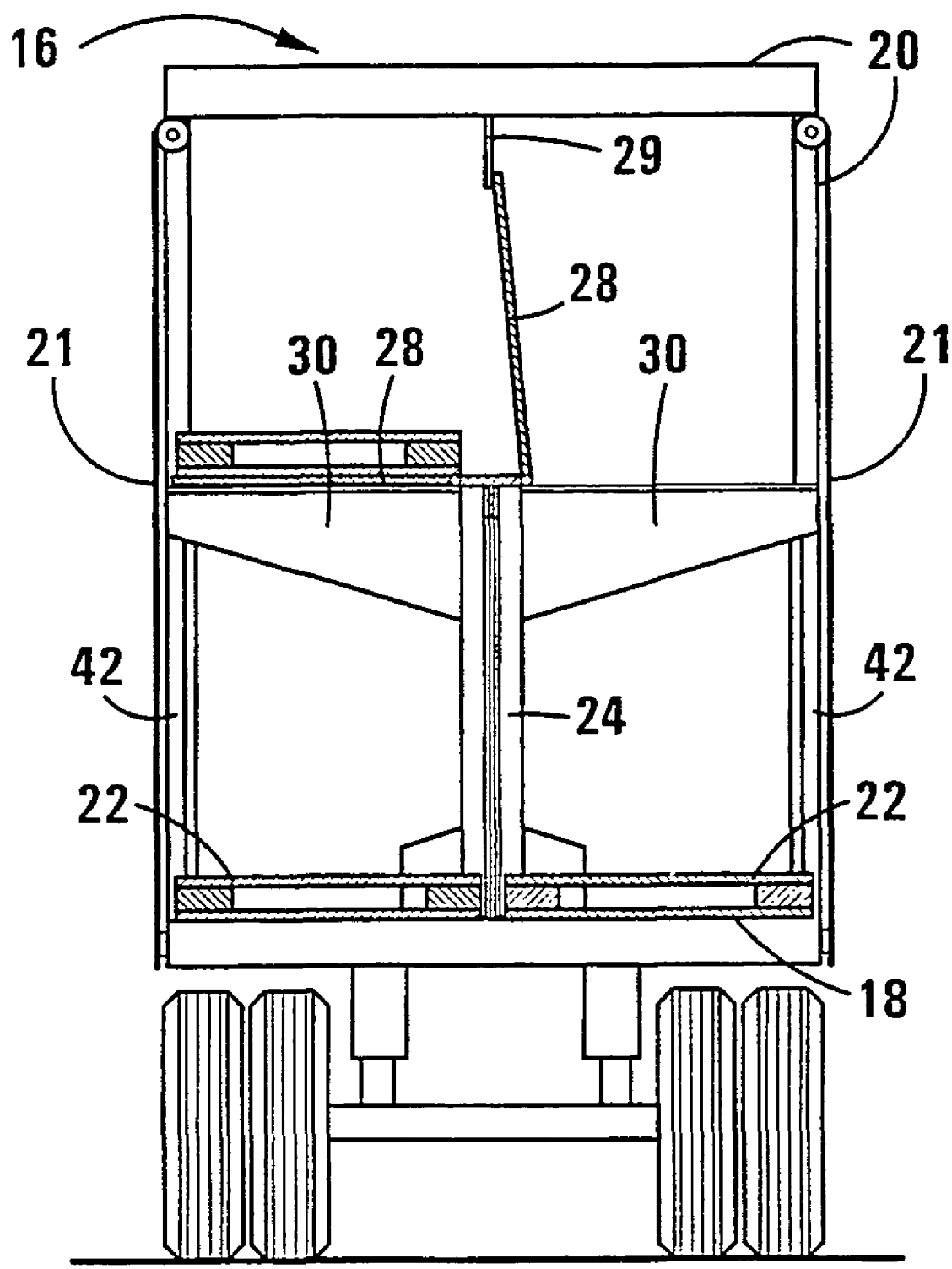

In accordance with the invention, each trailer 14 and 16 has a series of platform support structures including upright platform support columns 24 and platform support beams 26 extending between them and positioned along the centre line of the load deck 18 thereof, the platform support beams providing for the pivotal support of load platforms 28 at an elevated level above the load decks 18. The platform support structures have bracing members 25 providing additional strength and rigidity. The support columns 24 have platform support arms 30 (see FIGS. 2 to 6) extending in opposite directions thereof towards opposite sides of the bodies 20 forming the load carrying compartments, the support beams 26 and the support arms 30 providing for the support of the load platforms 28 at a desired elevated level above the load decks 18. The load platforms 28 are hingedly displaceable between an inoperative position, in which they extend operatively upwardly from the platform support structures and are supported against seating formations 29, and an operative position, in which they are supported on the support beams 26 and support arms 30 of the platform support structures. FIG. 2A illustrates a location within the load carrying compartment of the trailer 16 where a pair of load platforms are disposed in their inoperative position, whereas FIG. 2B illustrates a location where a pair of load platforms are disposed in their operative position and FIG. 2C illustrates a location where one load platform is in its inoperative position and the other load platform is in its operative position.

As is clearly illustrated in FIG. 1 of the drawings, each load platform 28 is disposed operatively above a side half of the load deck 18 and in this regard it must be appreciated also that the effective length of load platforms can be adapted either to be associated with a single pallet or to be associated with any alternative number of pallets located adjacent each other along the platform. It is envisaged also that a trailer can be provided only with two load platforms that extend along the entire length thereof and that are disposed above the respective side halves of the deck.

FIGS. 1 and 2 of the drawings also illustrate that where load platforms are disposed in their operative position, pallets can be supported on these platforms and this mode of support is particularly advantageous where voluminous type products are to be transported, insofar as two "layers" of pallets can then be conveniently transported within the trailers and the upper "layer" of pallets will not be supported directly on the lower "layer" of pallets. The products carried on the lower pallets therefore cannot be damaged by the upper pallets. This clearly permits the space within the load carrying compartments to be utilised more efficiently, the displacement of the load platform 28 still providing for sufficient flexibility to permit conventional loading of pallets which may be required, particularly where the effective height of products carried on pallets is not quite "standard", or where products carried on lower pallets will not be damaged by the load of products carried on pallets stacked thereon. It will be appreciated that insofar as reference is made hereinafter merely to the location of single pallets at each level, where the effective height of products carried on pallets is relatively low, pallets can be stacked on one another between the two levels described.

Figure 3:
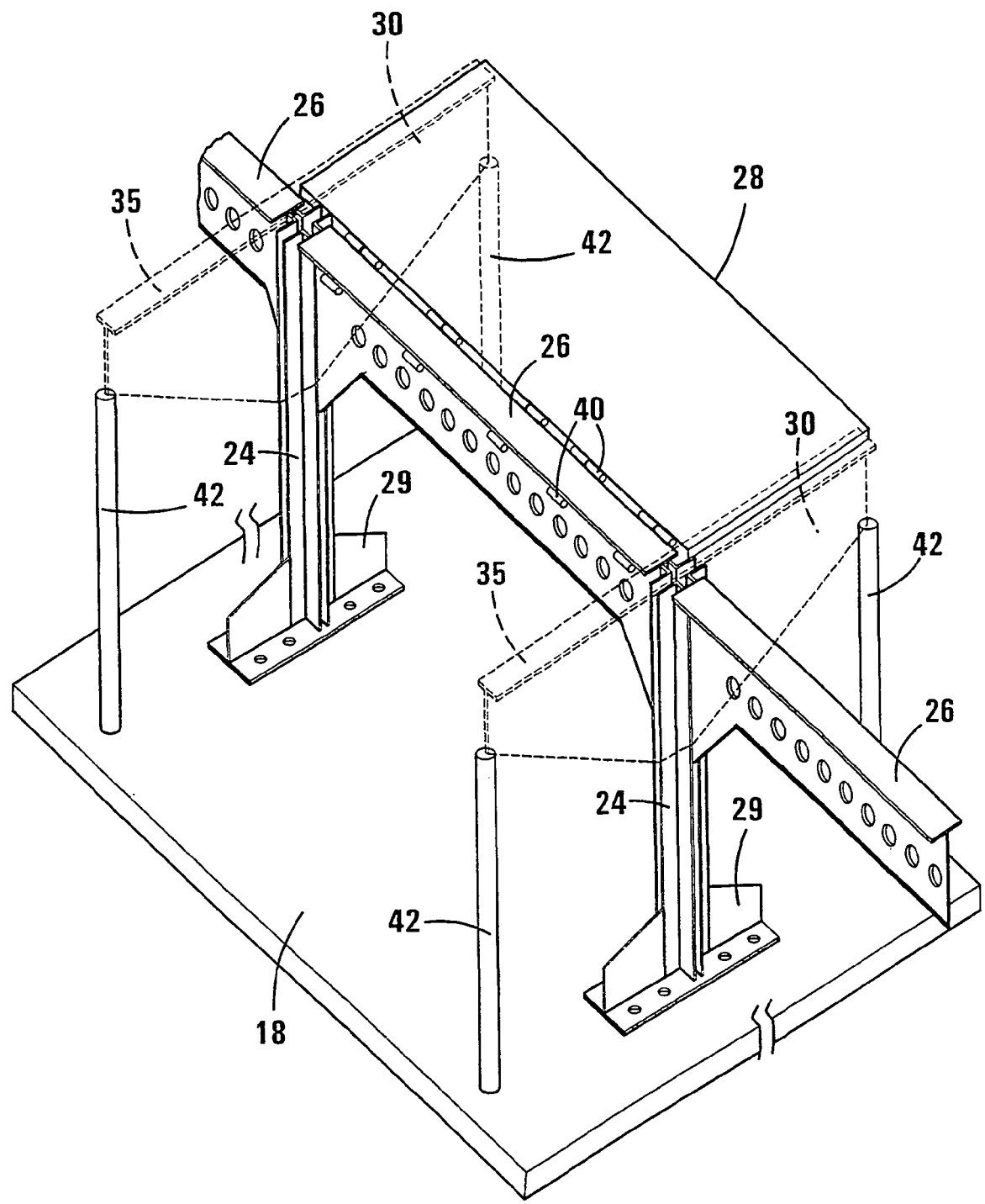
FIG. 3 shows in three-dimensions the configuration of a platform support structure for a load carrying vehicle as shown in FIG. 1.
Figure 4:
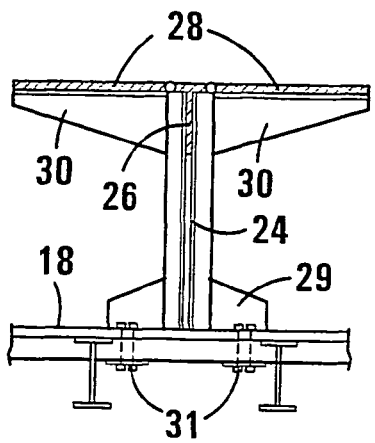
FIG. 4 shows an end view of the platform support structure of FIG. 3.
Figure 5:
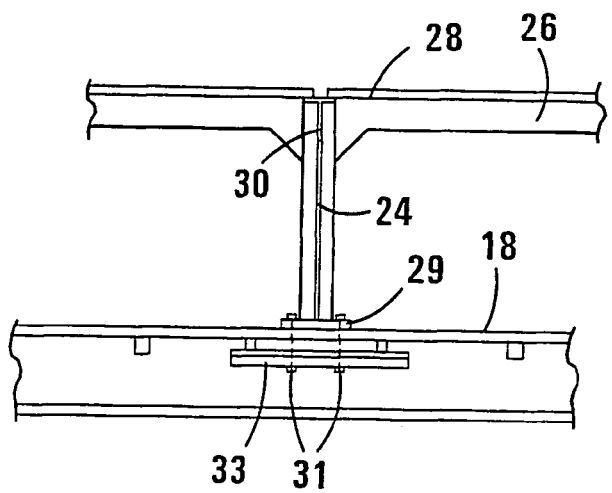
FIG. 5 shows a side view of the platform support structure of FIG. 3.

Referring also to FIGS. 3 and 4 of the drawings, the platform support structures including upright columns 24, support beams 26 and support arms 30 are illustrated in more detail therein, FIG. 3 illustrating clearly the location of the columns with respect to a load deck along the centre line of the load deck and the location of support beams between pairs of adjacent columns. Each support arm 30 has a T-shaped cross-sectional profile and defines an operative top flat surface 35, substantially parallel to the load deck 18, providing for the support thereon of two adjacent edges of a two adjacent load platforms 28. As is illustrated in FIGS. 3 to 6, collectively, of the drawings, each column 24 is mounted on the load deck 18 by means of a bolted connection which includes a webbed flange 29, eight bolt-and-nut combinations 31, and a connecting beam 33.

The support arms 30 are illustrated only in dotted lines in FIG. 3 of the drawings, but are illustrated more clearly in FIG. 4 of the drawings. As illustrated in FIG. 3 of the drawings, the support beam 26 provides five pairs of hinge formations 40 along opposite sides thereof, the hinge formations 40 providing for hinged connection of the load platforms 28 (only one shown in this drawing) with respect to the support beam, with the effective length of the load platforms being such that when positioned in their operative position, opposite ends thereof will be supported on the support arms 30. In order to enhance the rigid support of the support arms 30 and thereby of the load platforms 28, additional support posts 42 are located along opposite sides of the load deck in locations where they support the free ends of the support arms.

It will be appreciated that the overall construction of the platform support structures is greatly variable and, as such, the particular configuration platform support structures illustrated is not described in further detail herein.

Figure 6:
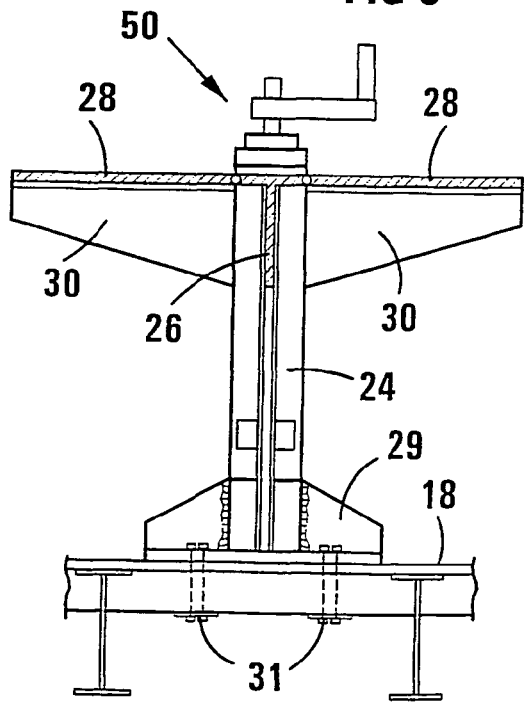
FIG. 6 illustrates in end view an alternative configuration platform support structure for use in a load carrying vehicle, in accordance with the invention.

Referring particularly to FIG. 6 of the drawings, there is generally illustrated a platform support structure that includes a height adjustment mechanism, generally indicated by the reference numeral 50. With like parts being designated by the same reference numerals as before, the mechanism 50 is operable to provide for the height adjustment of the support beams 26 and the support arms 30 of the platform support structure, thus permitting load platforms to be supported at different elevated levels within a load carrying compartment of a load carrying vehicle. This feature can thus accommodate specific load carrying requirements, particularly in relation to the dimensions of loads to be transported in associated vehicles.

It must be appreciated further that the load carrying vehicles of the invention as hereinabove defined and described can be associated also with various additional features that can enhance the effectiveness thereof and also that the specific configuration of the load carrying vehicles as described can be greatly varied while still incorporating the general principles of the invention as herein described. The invention therefore extends to all alternative configuration load carrying vehicles which incorporate the general principles of the invention as herein defined and described.

The invention claimed is:

1. A load carrying vehicle which has a body forming a load carrying compartment of the side loading type above a load deck and which includes a load support structure comprising
    at least one load platform for supporting at least one load item; and
    a platform support structure located along the centre line of the load deck, wherein the platform support structure supports the load platform from beneath the load platform such that the load platform is at an elevated level above a side half of the load deck, at a location between opposite ends of the load deck.

2. A load carrying vehicle as claimed in claim 1, in which the load platform is dimensioned to accommodate thereon a specific number of load items of a particular size positioned adjacent one another along the platform.

3. A load carrying vehicle as claimed in claim 1, wherein the load platform is supported by the platform support structure, and wherein the platform support structure comprises two spaced substantially upright platform support columns, secured on the load deck along the centre line of the load deck, and a platform support beam extending between the support columns along the centre line at substantially the elevated level at which the load platform is supported.

4. A load carrying vehicle as claimed in claim 3, in which each support column has a platform support arm extending therefrom in a direction perpendicular to the centre line of the load deck to enhance the support of the load platform.

5. A load carrying vehicle as claimed in claim 4, which includes for each support arm a support post that is secured to the load deck and that supports the operative free end of the support arm.

6. A load carrying vehicle as claimed in claim 4, in which each support arm extends to a location nearly vertically above a side edge of the load deck.

7. A load carrying vehicle as claimed in claim 4, in which each support column includes a height adjustment arrangement for adjusting the effective height of the support beam connected thereto and the support arm extending therefrom, thus providing for height adjustment of the load platform supported by the platform support structure.

8. A load carrying vehicle as claimed in claim 3, in which the support columns of the platform support structure each includes a height adjustment arrangement for adjusting the effective height of the support beam extending between them, thus providing for height adjustment of the load platform supported by the platform support structure.

9. A load carrying vehicle as claimed in claim 3, in which the support beam incorporates a hinge arrangement which permits the hinged displacement of the load platform supported by the platform support structure between an operative position, in which it extends in a substantially parallel configuration with respect to the load deck of the vehicle, and an inoperative position, in which it extends in a substantially perpendicular configuration with respect to the load deck within the load carrying compartment of the vehicle above the centre line of the load deck.

10. A load carrying vehicle as claimed in claim 3, in which the load platform extends along the entire length of the load carrying compartment.

11. A load carrying vehicle as claimed in claim 1, which includes above one said side half of the deck at least two load platforms, that in combination, extend along at least a part of the length of the load carrying compartment.

12. A load carrying vehicle as claimed in claim 1, which includes above each of the two side halves of the deck at least one load platform, the platform on each side extending along at least a part of the length of the load carrying compartment.

13. A load carrying vehicle as claimed in claim 11, wherein each load platform is supported by the platform support structure, and wherein the platform support structure comprises two spaced substantially upright platform support columns, secured on the load deck along the centre line of the load deck, and a platform support beam extending between the support columns along the said centre line at the elevated level at which the load platform is supported.

14. A load carrying vehicle as claimed in claim 13, in which adjacent ones of said load platforms have a common support column.

15. A load carrying vehicle as claimed in claim 12, in which the same platform support structure supports two load platforms disposed respectively above the two side halves of the deck.

* * * * *